(12) United States Patent
Chao et al.

(10) Patent No.: US 7,677,819 B2
(45) Date of Patent: Mar. 16, 2010

(54) CAMERA MODULE

(75) Inventors: Ta-Hsaing Chao, Taipei Hsien (TW);
Kuan-Te Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 211 days.

(21) Appl. No.: 11/937,365

(22) Filed: Nov. 8, 2007

(65) Prior Publication Data
US 2009/0010638 A1 Jan. 8, 2009

(30) Foreign Application Priority Data
Jul. 6, 2007 (CN) .................. 2007 1 0201024

(51) Int. Cl.
*G03B 17/00* (2006.01)
(52) U.S. Cl. ................... 396/529; 396/439
(58) Field of Classification Search ............. 396/439, 396/529, 533; 359/511, 611
See application file for complete search history.

(56) References Cited

U.S. PATENT DOCUMENTS

| | | | |
|---|---|---|---|
| 5,680,251 A * | 10/1997 | Kato et al. ............. | 359/557 |
| 5,719,712 A * | 2/1998 | Ishikawa .............. | 359/819 |
| 6,288,848 B1 * | 9/2001 | Shinohara et al. ....... | 359/696 |
| 6,590,720 B2 * | 7/2003 | Oba ................... | 359/819 |
| 6,597,518 B2 * | 7/2003 | Nomura et al. ......... | 359/699 |
| 7,110,089 B2 * | 9/2006 | Mizuno ................ | 355/67 |
| 2004/0212702 A1 * | 10/2004 | Suh ................... | 348/240.99 |
| 2005/0116138 A1 * | 6/2005 | Hanada et al. ......... | 250/206 |
| 2005/0162543 A1 * | 7/2005 | Kobayashi ............. | 348/371 |
| 2008/0169437 A1 * | 7/2008 | Chang ................. | 250/515.1 |
| 2008/0223934 A1 * | 9/2008 | Havens et al. ......... | 235/462.42 |

FOREIGN PATENT DOCUMENTS

| CN | 1365221 A | 8/2002 |
|---|---|---|
| CN | 1249991 C | 4/2006 |

* cited by examiner

*Primary Examiner*—W. B. Perkey
*Assistant Examiner*—Warren K Fenwick
(74) *Attorney, Agent, or Firm*—Zhigang Ma

(57) ABSTRACT

A camera module includes a lens, a lens barrel, a lens holder, a circuit board, an image sensor, and an elastic member. The lens barrel receives the lens therein and includes a flange protruding over the lens barrel. The lens holder is affixed to the circuit board to receive the image sensor therein. The elastic member is disposed between the lens barrel and the lens holder. A rim is formed on the lens holder. The elastic member has one end contacting the rim of the lens holder and the opposite end contacting the flange. The elastic member biases the lens barrel against the image sensor.

14 Claims, 6 Drawing Sheets

CAMERA MODULE

TECHNICAL FIELD

The present invention relates to camera modules and, particularly, to a camera module capable of preventing image distortion.

BACKGROUND

Referring to FIG. 1, a typical camera module 1 includes a lens barrel 2, a lens holder 3, an image sensor 4 and a circuit board 5. The lens barrel 2 receives at least a lens therein and disposes an outer screw thread 6 on an outer surface thereof. The lens holder 3 defines a compartment and disposes an inner screw thread 7. The inner screw thread 7 is a counterpart of the outer screw thread 6 to cooperatively engage the lens barrel 2 to a first end of the lens holder 3. The image sensor 4 is affixed onto the circuit board 5 by surface mount technology (SMT). The circuit board 5 is attached to a second end of the lens holder 3 and thus the image sensor 4 is received inside the lens holder 3.

However, due to limited precision in manufacturing, the central axis A1 of the image sensor 4 is not parallel to the central axis A2 of the camera module 1. Accordingly, images captured by the camera module 1 will be distorted.

SUMMARY

In accordance with a present embodiment, a camera module includes a lens, a lens barrel, a lens holder, a circuit board, an image sensor, and an elastic member. The lens barrel receives the lens therein and includes a flange protruding over the lens barrel. The lens holder is affixed to the circuit board to receive the image sensor therein. A rim is formed on the lens holder. The elastic member is disposed between the lens barrel and the lens holder. The elastic member has one end contacting with the rim and the opposite end contacting the flange. The elastic member biases the lens barrel against the image sensor.

Other advantages and novel features will be drawn from the following detailed description of at least one preferred embodiment, when considered conjunction with the attached drawings.

BRIEF DESCRIPTION OF THE DRAWING

Many aspects of the present camera module can be better understood with reference to the following drawing. The components in the drawing are not necessarily drawn to scale, the emphasis instead being placed upon clearly illustrating the principles of the present apparatus for testing reflectivity of a lens. Moreover, in the drawing, like reference numerals designate corresponding parts throughout.

DETAILED DESCRIPTION OF EMBODIMENTS

Figure 1:
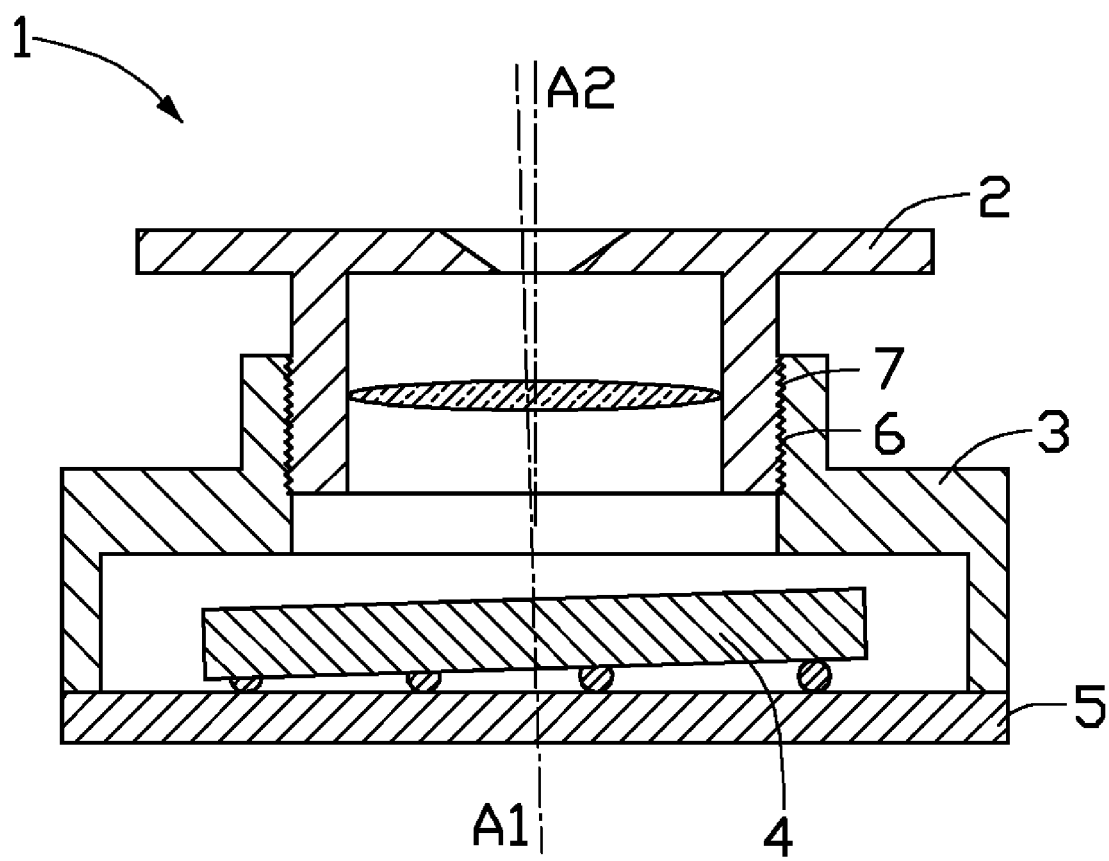
FIG. 1 is a schematic cross-section view of a typical camera module.

Embodiments of the present camera module will now be described in detail below and with reference to the drawing.

Figure 2:
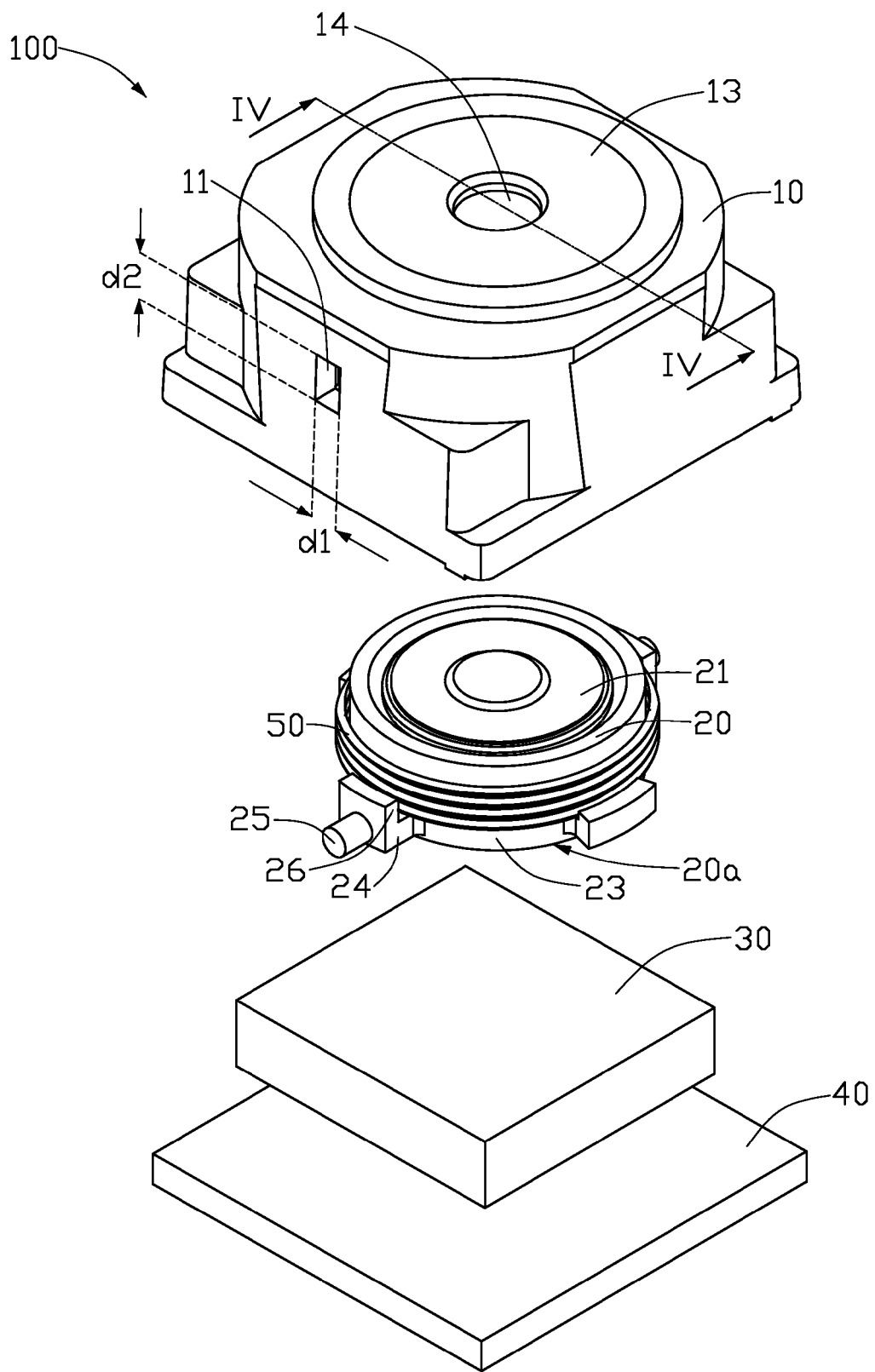
FIG. 2 is a perspective view of a camera module, according to a first present embodiment.
Figure 3:
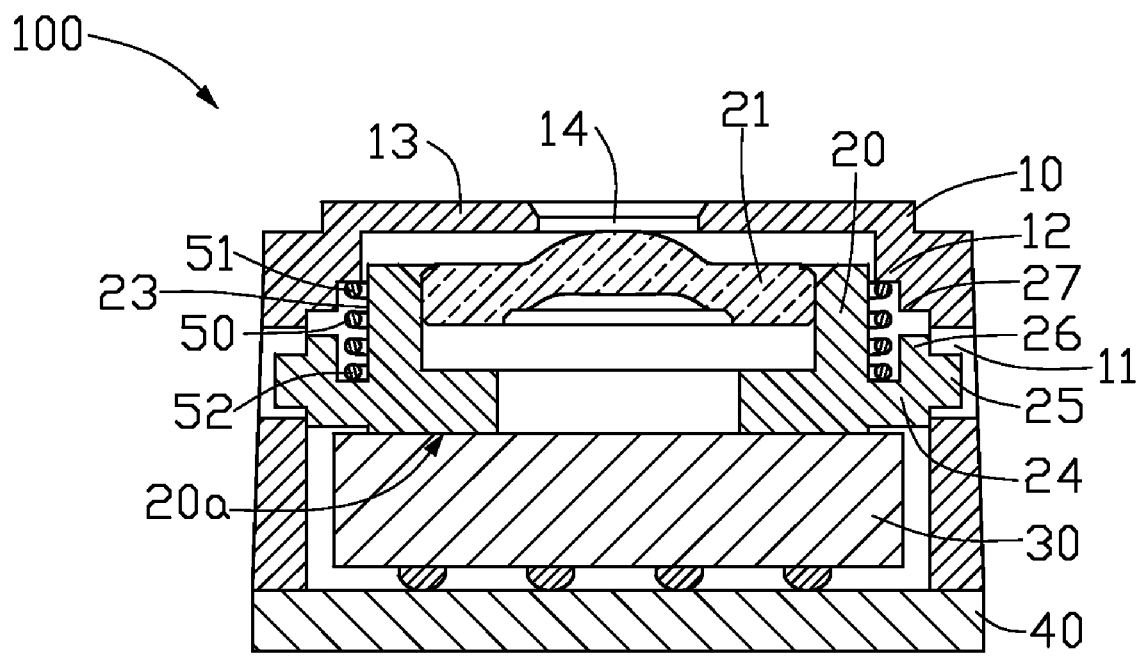
FIG. 3 is a schematic cross-section view of FIG. 2.

Referring to FIGS. 2-3, a camera module 100, according to a first present embodiment, includes a lens holder 10, a lens barrel 20, an image sensor 30, a circuit board 40, and an elastic member 50. The lens barrel 20 is received inside the lens holder 10. The image sensor 30 is affixed to a surface of the circuit board 40 to mechanically and electrically connect to the circuit board 40 by SMT. The lens holder 10 is affixed to the surface 40a and receives the image sensor 30 therein. The image sensor 30 is configured for detecting light transmitted through the lens barrel 20. The elastic member 50 is disposed between the lens holder 10 and the lens barrel 20 to bias the lens barrel 20 against the image sensor 30.

The circuit board 40 can be, for example, a printed circuit board (PCB). The lens barrel 20 receives at least a lens 21 therein and has at least a flange 24 protruding over an outer surface 23 of the lens barrel 20. The flange 24 contacts the end 52 of the elastic member 50 and receives a pushing force from the elastic member 50. The flange 24 may be only a singular flange disposed on the lens barrel 20 surrounding all or most of the circumference of the lens barrel 20. Alternatively, two or more flanges 24 may be disposed on the lens barrel 20 symmetrically and evenly disposed around the circumference of the lens barrel 20 receiving the pushing force from the elastic member 50. In this embodiment, four flanges 24 are symmetrically disposed around the lens barrel 20.

An extension 25 extends outwardly from an outer surface of the flange 24 in a radial direction of the lens barrel 20. The shape of the extension 25 can be pillar-like. If there is only one flange 24 disposed on the lens barrel 20, then, two extensions 25 are disposed on the flange 24. If a plurality of flanges 24 is disposed on the lens barrel 20, then, at least two extensions 25 are respectively formed on at least two flanges 24. In this embodiment, the extension 25 is a columnar. Two extensions 25 are respectively formed on two flanges 24 engagable on the lens holder 10 for constraining the lens barrel 20 inside of the lens holder 10.

The lens holder 10 defines a space for receiving the lens barrel 20 therein. A rim 12 is formed on the lens holder 10 at the end away from the image sensor 30. The rim 12 is configured for cooperating with the flange 24 to hold the elastic member 50 therebetween. A cover 13 can be formed on the rim 12. The cover 13 may be formed by extending the rim 12 past the central axis of the lens holder 10 or by disposing the cover 13 above the rim 12 at the end away from the image sensor 30. In this embodiment, the cover 13 is formed above the rim 12 at the end away from the image sensor 30. The cover 13 and the lens holder 10 are monolithically formed as one piece.

The cover 13 defines an opening 14 corresponding to the lens 21 to control magnitude of light transmitting therethrough. The lens holder 10 defines at least two holes in a sidewall thereof. The hole can be a through hole or a blind hole and can be rectangular or a circular to receive the corresponding extension 25 therein. In this embodiment, the hole is a rectangular through hole 11. The through hole 11 has a width d1 and a length d2. The width d1 is substantially equal to the diameter of the extension 25, and the length d2 is greater than the diameter of the extension 25. When the lens barrel 20 is assembled to the lens holder 10, the extension 25 engages with the through hole 11 to make the lens barrel 20 only moveable along an optical axis of the lens barrel 20. The lens barrel 20 is biased by the elastic member 50 to make a surface 20a of the lens barrel 20 contacts the image sensor 30 to maintain an optical surface of the image sensor 30 vertical to the optical axis of the lens barrel 20, thereby effectively preventing distortion of images captured by the image sensor 30. By constraining the extension 25 with the through hole 11, the lens barrel 20 is firmly attached to the lens holder 10.

Figure 4:
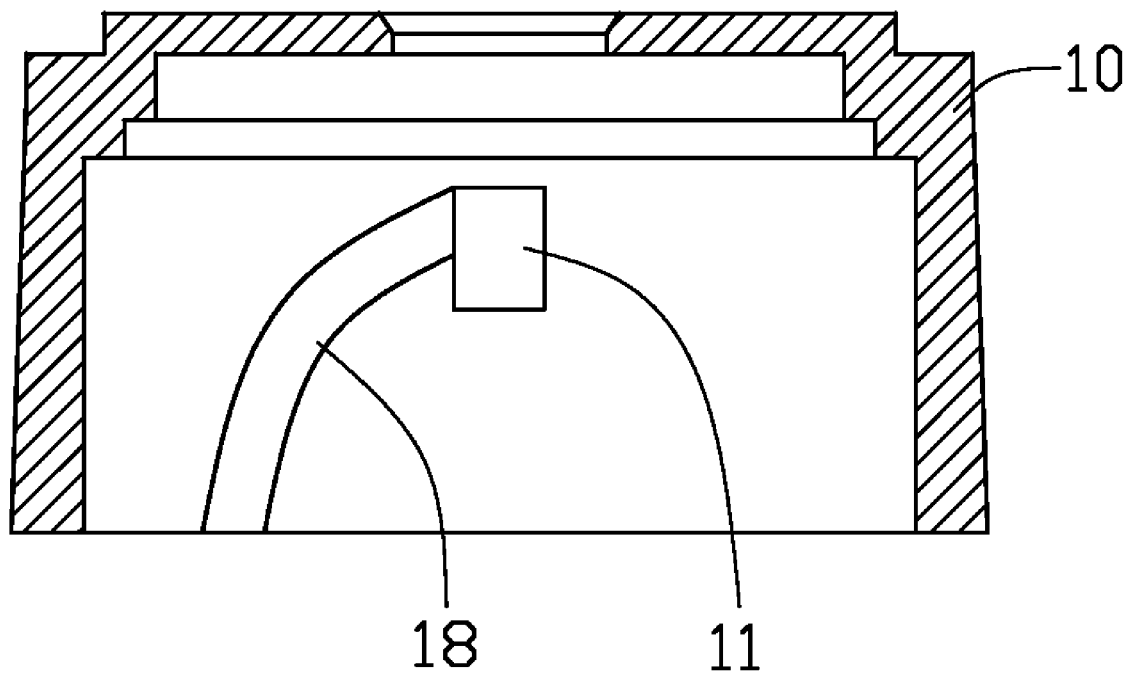
FIG. 4 is a cross-sectional view along line IV-IV of FIG. 2.

Referring to FIGS. 2-4, to facilitate assembly of the lens barrel 20 to the lens holder 10, a trench 18 is defined in the sidewall of the lens holder 10 for guiding the extension 25 into the through hole 11.

In this embodiment, the elastic member 50 is a spiral spring. The inside diameter of the elastic member 50 is slightly greater than that of the lens barrel 20 so that the elastic member 50 is capable of being installed around the periphery of the lens barrel 20. The elastic member 50 has one end 51 contacting the rim 12 of the lens holder 10 and the opposite end 52 contacting the flange 24 of the lens barrel 20. After the lens module 100 is assembled, the elastic member 50 biases both the lens holder 10 and the lens barrel 20 to make the lens barrel 20 closely contacts the image sensor 30.

Referring to FIG. 3, a protrusion 26 can be formed in the flange 24 to prevent lateral movement of the elastic member 50. The protrusion 26 and the lens barrel 20 cooperatively hold the end 52 of the elastic member 50 therebetween to constrain the elastic member 50.

A blocker 27 can be monolithically formed with the rim 12 to further constrain movement of the elastic member 50. The step-like blocker 27 and the lens barrel 20 cooperatively hold the end 51 therebetween to constrain the elastic member 50.

It will be understood that a transparent member can be installed between the lens holder 20 and the opening 14 of the cover 13 to protect the interior of the camera module 100 from dust.

Figure 5:
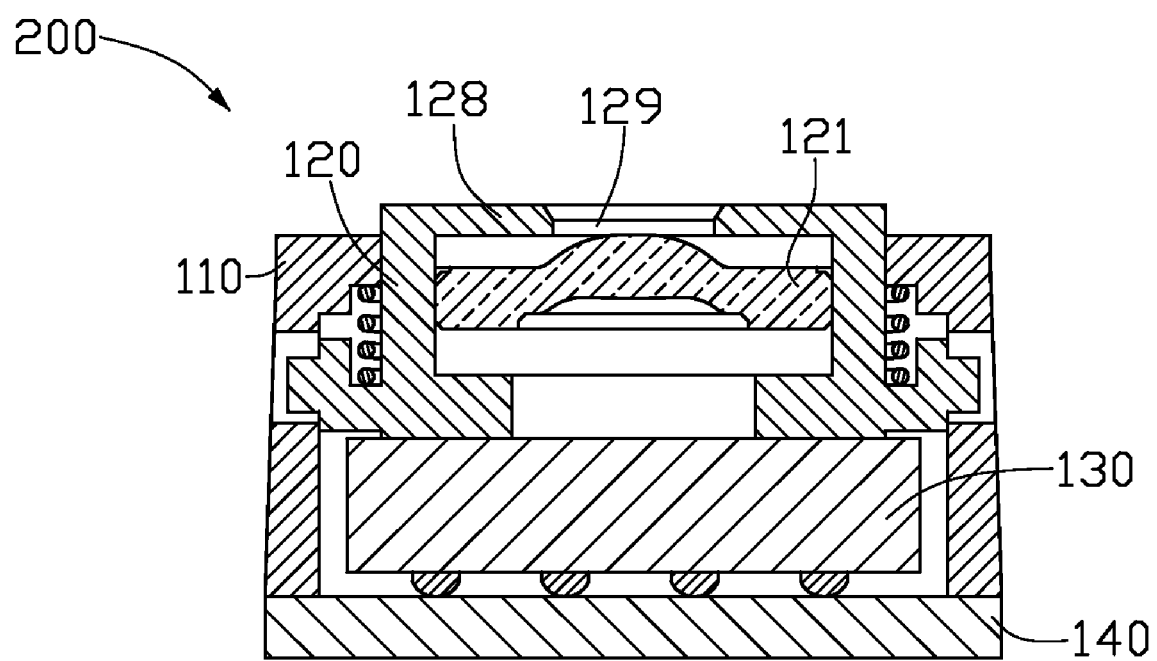
FIG. 5 is a cross-sectional view of a camera module, according to a second present embodiment.

Referring to FIG. 5, a camera module 200, in accordance with a second present embodiment, includes a lens holder 110, a lens barrel 120, an image sensor 130 and a circuit board 140. The camera module 200 is similar to the camera module 100 of the first embodiment. In this embodiment, a cover 128 is formed at one end of the lens barrel 120 away from the image sensor 130, but not on the lens holder 110. The cover 128 defines an opening 129 corresponding to the lens 121 for transmitting light therethrough.

Figure 6:
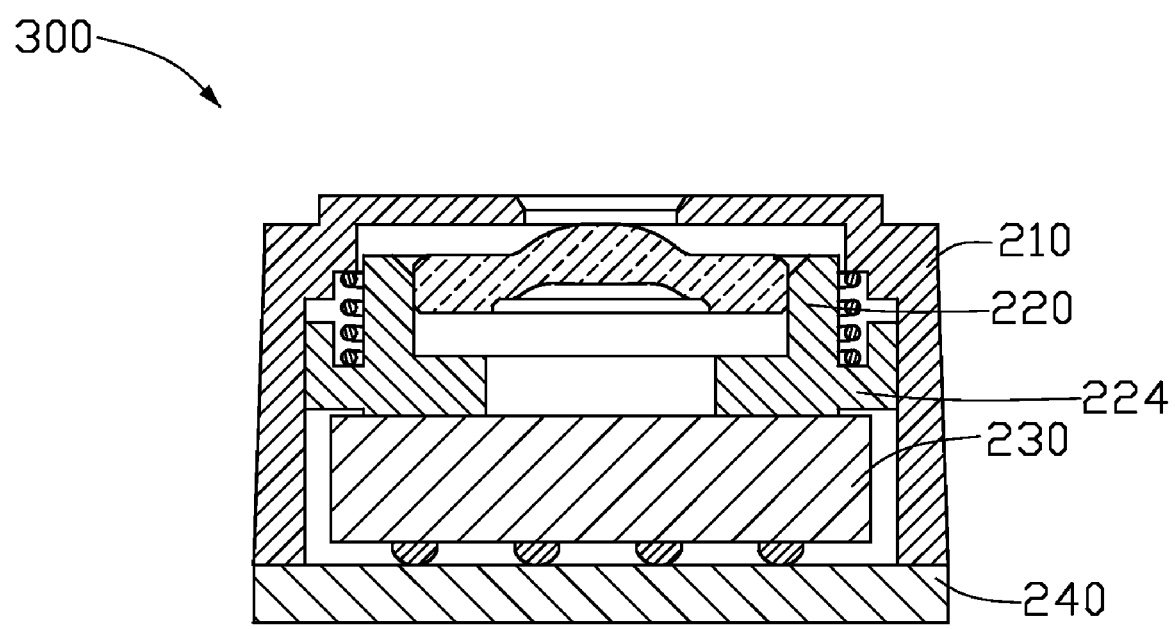
FIG. 6 is a cross-sectional view of a camera module, according to a third present embodiment.

Referring to FIG. 6, a cross-sectional view of a camera module 300, in accordance with a third present embodiment, includes a lens holder 210, a lens barrel 220, an image sensor 230 and a circuit board 240. The camera module 300 is also similar to the camera module 100 of the first embodiment. In this embodiment, there is no hole defined in the sidewall of the lens holder 210 and there is no extension formed on the lens barrel 220. Instead, the flange 224 is closely fitted within the sidewall of the lens holder 210.

To assemble the camera module in the above disclosed embodiments, firstly, the elastic member can be assembled to the lens barrel, then the lens barrel is assembled to the lens holder. For the camera modules respectively disclosed in the first and second present embodiments, the trench defined in the sidewall of the lens holder is configured for guiding the extension to the hole of the lens barrel. Once the lens holder is assembled to the lens barrel, the sub-assembly of the circuit board and the image sensor is then affixed to the lens holder to complete the assembly of the lens module. For the camera module disclosed in the third present embodiment, after the sub-assembly of the lens barrel and the elastic member is assembled to the lens holder, the lens holder is then inverted for affixing the circuit board to prevent the lens barrel and the elastic member from dropping out from the lens holder.

The elastic member disposed between the lens barrel and the lens holder provides a pushing force between the lens barrel and the image sensor. This facilitates close contact between the lens barrel and the image sensor and ensures a sensor plane of the image sensor being vertical to the central axis of the lens barrel. It effectively prevents distortion of images captured by the image sensor.

It will be understood that the above particular embodiments and methods are shown and described by way of illustration only. The principles and features of the present invention may be employed in various and numerous embodiments thereof without departing from the scope of the invention as claimed. The above-described embodiments illustrate the scope of the invention but do not restrict the scope of the invention.

What is claimed is:

1. A camera module comprising:
   at least one lens;
   a lens barrel configured for receiving the lens therein and comprising at least a flange protruding over an outer surface thereof;
   a lens holder defining a space configured for receiving the lens barrel therein, a rim formed on the lens holder and facing the space;
   a circuit board;
   an image sensor affixed to the circuit board, the lens holder affixed to a surface of the circuit board to receive the image sensor inside of the space; and
   an elastic member disposed between the lens barrel and the lens holder, one end of the elastic member contacting the rim and the other end contacting the flange for biasing the lens barrel against the image sensor.

2. The camera module as claimed in claim 1, wherein the rim is formed at an end of the lens holder away from the image sensor.

3. The camera module as claimed in claim 1, wherein at least two extensions are formed on a first end of the flange, the extensions protruding over the flange along a direction away from the lens barrel.

4. The camera module as claimed in claim 3, wherein at least two holes are formed in a sidewall of the lens holder to receive the corresponding extensions therein.

5. The camera module as claimed in claim 4, wherein the hole is selected from a through hole and a blind hole.

6. The camera module as claimed in claim 4, wherein a trench is defined in the sidewall of the lens holder for guiding the extension into the holes.

7. The camera module as claimed in claim 4, wherein the width of each of the holes is substantially equal to the diameter of the corresponding extension, and the length is greater than the diameter of the corresponding extension.

8. The camera module as claimed in claim 1, wherein a protrusion is formed in the flange, the protrusion protruding over the flange along the central axis of the lens barrel.

9. The camera module as claimed in claim 8, wherein the other end of the elastic member is held between the protrusion and the lens barrel.

10. The camera module as claimed in claim 9, wherein a cover is formed in the rim and an opening is formed in the cover corresponding to the lens.

11. The camera module as claimed in claim 10, wherein the cover and the lens holder are monolithically formed as one piece.

12. The camera module as claimed in claim 1, wherein the elastic member is a spiral spring installed around the periphery of the lens barrel.

13. The camera module as claimed in claim 1, wherein a blocker is formed on the lens holder, the blocker and the lens barrel cooperatively hold the one end of the elastic member therebetween.

14. The camera module as claimed in claim 1, wherein the flange is closely fitted within a sidewall of the lens holder surrounding the space.

* * * * *